(12) United States Patent
Ichida (10) Patent No.: US 9,202,377 B2
(45) Date of Patent: Dec. 1, 2015

(54) OBJECT DETERMINATION APPARATUS AND COLLISION AVOIDANCE ASSISTANCE APPARATUS

(71) Applicant: Hiroyasu Ichida, Toyota (JP)

(72) Inventor: Hiroyasu Ichida, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 38 days.

(21) Appl. No.: 13/896,554

(22) Filed: May 17, 2013

(65) Prior Publication Data

US 2013/0311077 A1 Nov. 21, 2013

(30) Foreign Application Priority Data

May 18, 2012 (JP) ................. 2012-114795

(51) Int. Cl.
*G08G 1/16* (2006.01)
*G01S 7/41* (2006.01)
*G01S 13/93* (2006.01)
*B60W 30/09* (2012.01)

(52) U.S. Cl.
CPC . *G08G 1/16* (2013.01); *G01S 7/411* (2013.01); *G01S 13/931* (2013.01); *G08G 1/165* (2013.01); *G08G 1/166* (2013.01); *B60W 30/09* (2013.01); *G01S 2013/9342* (2013.01); *G01S 2013/9346* (2013.01); *G01S 2013/9375* (2013.01); *G01S 2013/9378* (2013.01)

(58) Field of Classification Search
CPC ....................................................... G08G 1/16
USPC ................................................. 701/300–302
See application file for complete search history.

(56) References Cited

U.S. PATENT DOCUMENTS

| | | | |
|---|---|---|---|
| 2005/0278098 A1* | 12/2005 | Breed | 701/45 |
| 2007/0152804 A1* | 7/2007 | Breed et al. | 340/435 |
| 2008/0040004 A1* | 2/2008 | Breed | 701/45 |
| 2008/0040023 A1* | 2/2008 | Breed et al. | 701/117 |
| 2008/0106462 A1* | 5/2008 | Shiraishi | 342/146 |
| 2008/0133136 A1* | 6/2008 | Breed et al. | 701/301 |
| 2008/0169966 A1* | 7/2008 | Tsuchihashi et al. | 342/70 |
| 2009/0045999 A1 | 2/2009 | Samukawa et al. | |

FOREIGN PATENT DOCUMENTS

| | | |
|---|---|---|
| JP | 07-244154 A | 9/1995 |
| JP | 2012-008718 A | 1/2012 |

\* cited by examiner

*Primary Examiner* — Muhammad Shafi
*Assistant Examiner* — Majdi Alsomiri
(74) *Attorney, Agent, or Firm* — Sughrue Mion, PLLC

(57) ABSTRACT

An object determination apparatus includes: a sensing device that is mounted in a host vehicle, and that sends detection wave and receives the detection wave reflected from an object, and that detects the object; a detection unit that detects the state of reflection intensity of the detection wave received by the sensing device which changes with the distance to the object; and a determination unit that determines that the object is a vehicle other than the host vehicle when a peak of the reflection intensity exceeds a predetermined threshold value. Peaks of the reflection intensity change in accordance the distance to the object, but the peaks regarding vehicles tend to be higher than the peaks regarding on-road structures. Hence, by comparing a peak of the reflection intensity with the predetermined threshold value, it can be determined whether the detected object is a vehicle other than the host vehicle.

8 Claims, 7 Drawing Sheets

OBJECT DETERMINATION APPARATUS AND COLLISION AVOIDANCE ASSISTANCE APPARATUS

INCORPORATION BY REFERENCE

The disclosure of Japanese Patent Application No. 2012-114795 filed on May 18, 2012 including the specification, drawings and abstract is incorporated herein by reference in its entirety.

BACKGROUND OF THE INVENTION

1. Field of the Invention

The invention relates to an object determination apparatus, a collision avoidance assistance apparatus and an object determination method.

2. Description of Related Art

As a related art, there is known a collision avoidance assistance apparatus mounted in a host vehicle which detects another vehicle or the like present in the traveling direction of the host vehicle and which assists in avoidance of the collision with the detected vehicle. This collision avoidance assistance apparatus sets a detection region in the traveling direction of the host vehicle. When an object enters the detection region, the collision avoidance assistance apparatus performs a collision avoidance control, for example, warning, braking and/or steering intervention.

In the above-described collision avoidance assistance apparatus, the collision avoidance control is sometimes unnecessarily performed when an on-road structure that usually does not hinder the traveling of vehicles (e.g., a guardrail, a steel plate, etc.) enters the detection region. In order to avoid such unnecessary activation of the collision avoidance control, it is necessary to appropriately determine whether the object detected is a vehicle other than the host vehicle.

On another hand, as an apparatus that determines an object present in the traveling direction of a vehicle, there is known, for example, an object determination apparatus described in Japanese Patent Application Publication No. 7-244154 (JP 7-244154 A). This object determination apparatus determines whether an object present in the traveling direction of the vehicle is a reflector (reflecting plate) or other objects on the basis of the reflection intensity of detection wave that is sent out from the vehicle and reflected from the object.

However, the above-described object determination apparatus is not capable of determining whether an object detected is a vehicle other than the host vehicle.

SUMMARY OF THE INVENTION

The invention provides an object determination apparatus, a collision avoidance assistance apparatus and an object determination method that are capable of determining whether an object detected is a vehicle other than a host vehicle.

An object determination apparatus in accordance with a first aspect of the invention includes: a sensing device that is mounted in a host vehicle, and that sends detection wave and receives the detection wave reflected from an object, and that detects the object in accordance with the received detection wave; a detection unit that detects reflection intensity of the detection wave received by the detection unit, the reflection intensity changing in accordance with distance to the object; and a determination unit that determines that the object is a vehicle other than the host vehicle when a peak of the reflection intensity exceeds a predetermined threshold value.

In a collision avoidance assistance apparatus in accordance with a second aspect of the invention, when an object is determined as being a vehicle other than a host vehicle by the object determination apparatus as described above, a detection region that is used for determining whether to perform a collision avoidance control, and that is set in a traveling direction of the host vehicle, and that is a region into which it is determined whether the object has come is made larger than when the object is determined as not being a vehicle other than the host vehicle.

An object determination method in accordance with a third aspect of the invention characterized by comprising steps of sending detection wave and receiving the detection wave reflected from an object, and detecting the object in accordance with the received detection wave; detecting reflection intensity of the detection wave received, the reflection intensity changing in accordance with distance to the object; determining the object as being a vehicle other than the host vehicle when a peak of the reflection intensity exceeds a predetermined threshold value.

According to the aspects of the invention, it is possible to provide an object determination apparatus, a collision avoidance assistance apparatus and an object determination method that are capable of determining whether an object detected is a vehicle other than the host vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described in detail below with reference to the accompanying drawings. Note that the same elements are denoted by the same reference characters in the drawings, and redundant descriptions are omitted below.

Figure 1:
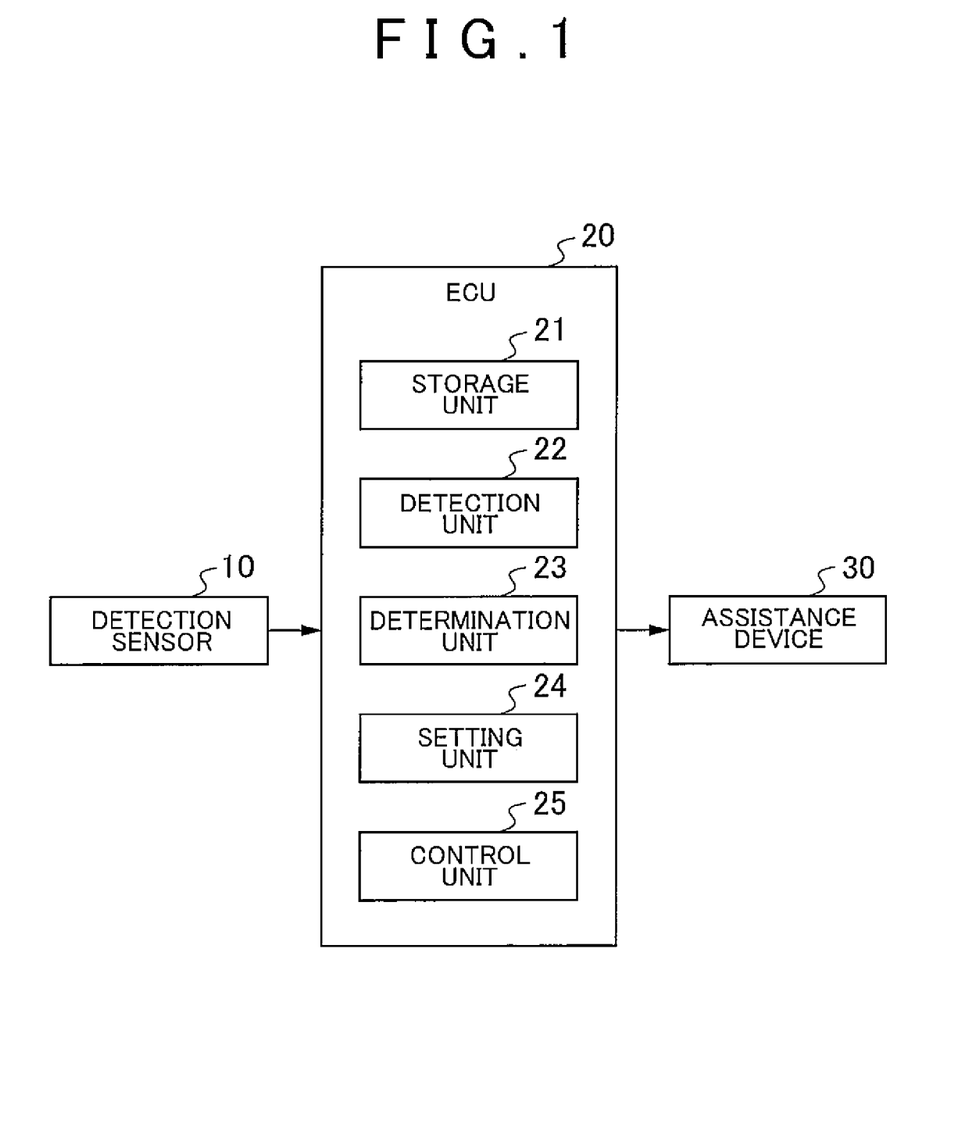
FIG. 1 is a block diagram showing a construction of a collision avoidance assistance apparatus in accordance with an embodiment of the invention.

Firstly, with reference to FIG. 1, a construction of a collision avoidance assistance apparatus in accordance with an embodiment of the invention will be described. FIG. 1 is a block diagram showing a construction of the collision avoidance assistance apparatus in accordance with an embodiment of the invention.

The collision avoidance assistance apparatus is an apparatus that assists in avoidance of a collision with a vehicle other than a host vehicle, on the basis of a result of detection of an object. As shown in FIG. 1, the collision avoidance assistance apparatus mounted in a vehicle (not shown) includes a detection sensor 10 (sensing device 10), an ECU (Electronic Control Unit) 20 and an assistance device 30. The ECU 20 is connected to the detection sensor 10. The assistance device 30 is connected to the ECU 20.

The detection sensor 10 functions as a sensing device that is configured to send detection wave, receive detection wave reflected from an object and thus detect the object. The detection sensor 10 is assumed to be installed on a front surface of the vehicle in this embodiment, but may also be installed on a rear surface of the vehicle. Furthermore, as the detection sensor 10, a millimeter wave radar sensor is employed in this embodiment, but a laser radar sensor or the like may also be employed.

The detection sensor 10 detects an object by sending detection wave forward from the vehicle and receiving detection wave reflected from an object present in front of the vehicle. Then, the detection sensor 10 supplies a detection result to the ECU 20. The detection result includes the reflection intensity of the detection wave reflected from the object, distance information indicating the distance to the object, lateral position information indicating a lateral positional relationship with the object, and velocity information indicating the relative velocity of the object. Incidentally, the reflection intensity of detection wave is the reception intensity of detection wave that is reflected from an object and received by the detection sensor 10.

The ECU 20 includes a storage unit 21, a detection unit 22, a determination unit 23, a setting unit 24 and a control unit 25. It is to be noted herein that the storage unit 21, the detection unit 22 and the determination unit 23, together with the detection sensor 10, constitute an object determination apparatus that determines whether an object is a vehicle other than the host vehicle, on the basis of a result of detection regarding the object.

The ECU 20 is made up mainly of a CPU (Central Processing Unit) a ROM (Read-Only Memory) and a RAM (Random Access Memory). The CPU realizes the functions of the storage unit 21, the detection unit 22, the determination unit 23, the setting unit 24 and the control unit 25 by reading out programs from the ROM and the like and executing them on the RAM. Incidentally, the functions of the storage unit 21, the detection unit 22, the determination unit 23, the setting unit 24 and the control unit 25 may also be realized by two or more ECUs.

The storage unit 21 temporarily stores detection results supplied from the detection sensor 10. As the storage unit 21, a storage element, such as a memory or the like, is employed. The detection results stored in the storage unit 21 are read out according to need. Detection results are read out for the purpose of the processing performed in the detection unit 22, the determination unit 23 or the control unit 25.

The detection unit 22 detects the state of the reflection intensity of detection wave received. The detection unit 22 detects the state of the reflection intensity of the detection wave supplied from the detection sensor 10, and supplies a result of detection result to the determination unit 23. The detection unit 22 detects a peak of the reflection intensity on the basis of the state of the reflection intensity. A peak of the reflection intensity refers to a convex point that appears on a detection waveform that shows a relationship between the distance (relative distance) to the object and the reflection intensity.

Furthermore, the detection unit 22 may detect the tendency of change of peaks of the reflection intensity and/or the magnitude of amplitude of the reflection intensity. The tendency of change of peaks refers to the tendency of distribution of peaks over the detection waveform (the tendency of increase and/or decrease in intensity of a plurality of peaks). The magnitude of amplitude refers to the width of up-down fluctuations (the magnitude of fluctuations) of the detection waveform. Incidentally, the detection unit 22 detects the tendency of change of peaks, the magnitude of amplitude, etc., on the basis of the state of the reflection intensity.

The determination unit 23 determines the kind of an object on the basis of the state of the reflection intensity. The determination unit 23 determines the kind of the object on the basis of distance information, the lateral position information, the velocity information, and the state of the reflection intensity supplied from the detection unit 22. The determination unit 23 supplies the kind of an object to a setting unit 24. The distance information, the lateral position information and the velocity information are supplied from the detection sensor 10. In this embodiment, results of the determination are used for the setting of a detection region for the collision avoidance control, but may also be used for other uses.

The determination unit 23 determines that the object is a vehicle other than the host vehicle, when a peak of the reflection intensity exceeds a predetermined threshold value. Peaks of the reflection intensity change according to the distance to the object. It is to be noted herein that the predetermined threshold value is a threshold value for use for determining the kind of the object. In particular, the predetermined threshold value is a threshold value for use for determining whether the detected object is a vehicle other than the host vehicle or an on-roach structure. The predetermined threshold value is set beforehand according to the distance to an object so that a vehicle other than the host vehicle and an on-road structure can be discriminated from each other. The on-road structure is an object that does not hinder the normal traveling of a vehicle. For example, the on-road structure is a guardrail, a steel plate (e.g., a manhole lid, a ditch cover, etc.)

When a peak of the reflection intensity of the detection wave reflected from a detected object exceeds the predetermined threshold value, it is determined that this object is a vehicle other than the host vehicle. Peaks of the reflection intensity change with the distance to the object. However, peaks of the reflection intensity of a vehicle other than the host vehicle tend to be higher than peaks of the reflection intensity of an on-road structure. Hence, by comparing the peak of the reflection intensity with the predetermined threshold value, it can be accurately determined whether the detected object is a vehicle other than the host vehicle.

Furthermore, the determination unit 23 may determine whether an object is a vehicle other than the host vehicle on the basis of the tendency of change of a peak of the reflection intensity that changes according to the distance to the object. The peak of the reflection intensity changes with the distance to the object as stated above. Due to the reflection characteristics of the object, the peak of the reflection intensity of a vehicle other than the host vehicle increases as the host vehicle approaches the vehicle. On the other hand, the peak of the reflection intensity of an on-road structure tends to decrease as the host vehicle approaches the on-road structure in the case where the posture of the host vehicle has changed due to steering avoidance. Hence, it can be more accurately determined whether the object is a vehicle other than the host vehicle on the basis of the tendency of change of the peak of the reflection intensity.

Furthermore, the determination unit 23 may determine whether the object is a vehicle other than the host vehicle on the basis of the magnitude of amplitude of the reflection intensity, which changes according to the distance to the object. Although the amplitude of the reflection intensity changes with the distance to the object, the amplitude of the reflection intensity of a vehicle other than the host vehicle tends to more greatly change than the amplitude of the reflection intensity of an on-road structure, due to the reflection characteristics of objects. Hence, it can be more accurately determined whether the object is a vehicle other than the host vehicle on the magnitude of amplitude of the reflection intensity.

The setting unit 24 sets a detection region in the traveling direction of the host vehicle on the basis of a result of the determination regarding an object. The setting unit 24 sets a detection region in the traveling direction of the vehicle on the basis of the result of the determination supplied from the determination unit 23. It is to be noted herein that the detection region refers to a region that is virtually set in order to determine whether to perform the collision avoidance control. The detection region is set in the traveling direction of the vehicle. The detection region is a region whose shape is rectangular, semielliptical, etc. The detection region is usually set as an ordinary region that extends several meters in the traveling direction of the vehicle. The ordinary region extends several meters in the traveling direction of the vehicle. The detection region is set as an enlarged region than ordinary region when a detected object is determined as being a vehicle other than the host vehicle. The enlarged region is a region that is temporarily expanded in the traveling direction of the vehicle.

Then, in the collision avoidance assistance apparatus, the collision avoidance control is executed when it is determined that an object has entered the detection region. That is, when it is determined that an object is a vehicle other than the host vehicle, the detection region of the detection sensor is made larger than when it is determined that the object is not a vehicle other than the host vehicle. The detection region of the detection sensor is used for determining whether to perform the collision avoidance control, and that is set in the traveling direction of the host vehicle, and that is a region into which it is determined whether an object has come. Thus, the use of an expanded detection region makes it possible to perform the collision avoidance control with an enough time margin prior to the collision with the vehicle other than the host vehicle.

The control unit 25 controls the assistance in avoiding a collision with a vehicle other than the host vehicle on the basis of a result of the determination regarding the object present in the detection region. The control unit 25 determines whether an object has come into the detection region. The control unit 25 determines whether an object has entered the detection region on the basis of a detection result (distance information, lateral position information) and the set range of the detection region. The detection result is supplied from the detection sensor 10. The set range of the detection region is set by the setting unit 24.

Then, the control unit 25, when determining that an object has entered the detection region, then controls the assistance device 30 according to the position of the object that has entered the detection region and/or the state of movement thereof. For example, when a predicted time point of collision with the object which is found according to the position and/or the state of movement of the object exceeds a predetermined threshold value, the control unit 25 only activates a warning operation, and when the predicted time point of collision is less than the threshold value, the control unit 25 activates control intervention as well as the warning.

The assistance device 30 executes collision avoidance assistance, such as warning, braking and/or steering intervention, etc., under the control by the control unit 25. The assistance portion 30, with regard to entrance of an object into the detection region, gives warning by using information perceptible to a driver, such as visual information, auditory information, etc. Furthermore, the assistance device 30 intervenes with the steering or braking control so as to assist in the avoidance of a collision with an object that has entered the detection region.

Next, operations of the collision avoidance assistance apparatus in accordance with the embodiment of the invention will be described.

Figure 2:
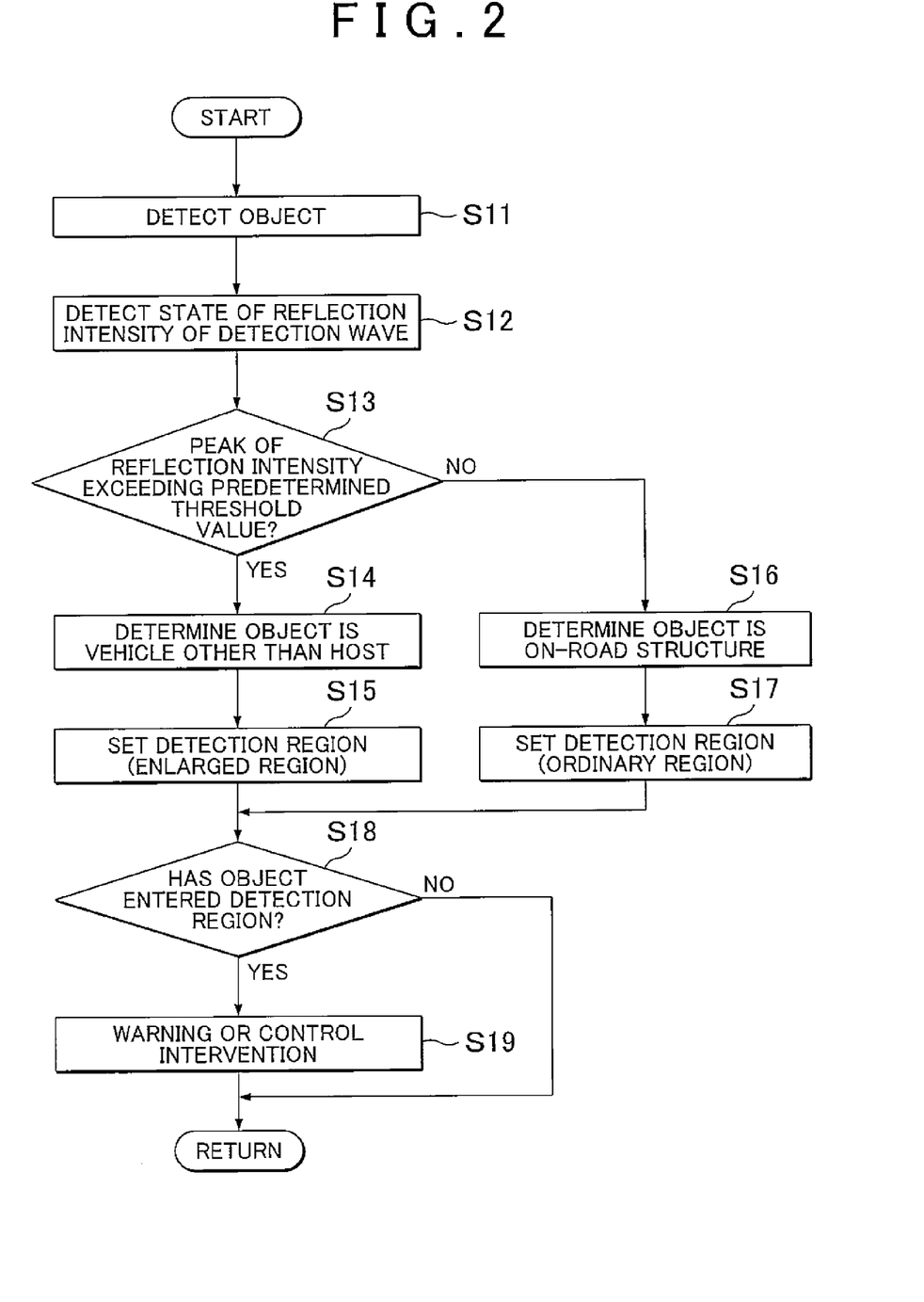
FIG. 2 is a flowchart showing operations of the collision avoidance assistance apparatus shown in FIG. 1.

FIG. 2 is a flowchart showing operations of the collision avoidance assistance apparatus shown in FIG. 1. The collision avoidance assistance apparatus repeatedly executes a process shown in FIG. 2 at every predetermined time period.

As shown in FIG. 2, the detection sensor 10 detects an object on the basis of a result of reception of the detection wave reflected from the object (S11). At this stage, the presence and the position of the object are determined, but the kind of the object is not determined yet.

The detection unit 22 detects the state of the reflection intensity of the detection wave on the basis of a result of detection of the object (S12). The reflection intensity of the detection wave changes with the distance to the object.

Figure 3:
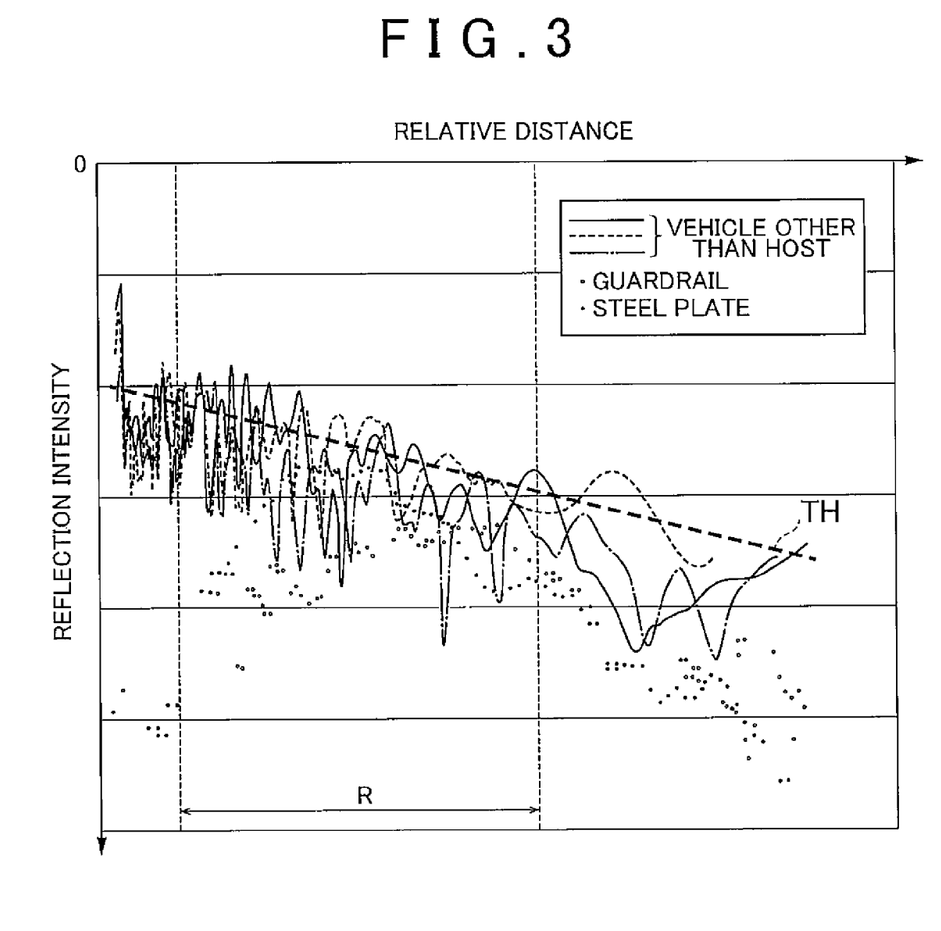
FIG. 3 is a diagram showing peaks of the reflection intensity in comparison among vehicles other than a host vehicle and on-road structures.

FIG. 3 is a diagram showing peaks of reflection intensity in comparison between vehicles other than the host vehicle and on-road structures. In FIG. 3 there are shown detection waveforms each of which shows a relationship between the distance (relative distance) to a corresponding object and the reflection intensity of the detection wave reflected from the object. FIG. 3 shows examples of detection waveforms regarding three kinds of vehicles other than the host vehicle (preceding vehicles) that are traveling at low speed as well as on-road structures (a guardrail and a steel plate).

As shown in FIG. 3, although peaks of the reflection intensity change with the distance between the host vehicle and the object, peaks of the reflection intensity of vehicles other than the host vehicle tend to be higher than peaks of the reflection intensity of on-road structures. Hence, by comparing peaks of reflection intensity with a predetermined threshold value TH, it can be determined whether an object detected is a vehicle other than the host vehicle.

It is to be noted herein that the predetermined threshold value TH is set according to the relative distance to the object so that a vehicle other than the host vehicle and an on-road structure can be discriminated from each other. In the example shown in FIG. 3, the predetermined threshold value TH is defined by a straight line that monotonously rises with decreases in the relative distance. However, the predetermined threshold value TH may also be defined by a combination of straight lines, a combination of curves, or a combination of straight and curved lines.

Referring back to FIG. 2, after the state of the reflection intensity of the detection wave is detected in S12, the determination unit 23 determines whether a peak of the reflection intensity exceeds the predetermined threshold value (S13). This peak determination is performed by comparing the peak of the reflection intensity and the predetermined threshold value that corresponds to the relative distance of the object measured at the time of occurrence of the peak.

It is to be noted herein that in order to secure a sufficient determination accuracy, the peak determination is performed if the relative distance satisfies a predetermined condition (the relative distance is not too long and not too short. e.g., the relative distance be within a distance range R shown in FIG. 3) and the lateral position of the object satisfies a predetermined condition (the object be substantially directly facing the front of the host vehicle).

Furthermore, the peak determination may be performed with respect to one peak of the detection waveform, and may also be performed with respect to a plurality of peaks. The peak determination can be performed with respect to more peaks that occur within a period during which the relative distance of the object satisfies the predetermined condition, as the relative velocity of the object is smaller. By synthetically considering results of the determination with respect to a plurality of peaks, the determination accuracy can be improved.

The determination unit 23 determines whether the object is a vehicle other than the host vehicle on the basis of the result of the determination provided in S13. FIG. 2 illustrates a case where the kind, of the object is determined on the basis of comparison of a peak of the reflection intensity with the predetermined threshold value. Furthermore, the kind of the object may be determined by taking into account the tendency of change of peaks of the reflection intensity or the magnitude of amplitude of the reflection intensity.

Then, when in S13 it is determined that a peak of the reflection intensity exceeds the predetermined threshold value, it is determined that the object is a vehicle other than the host vehicle (S14). In that case, the setting unit 24 sets the detection region as an expanded region that is temporarily expanded (S15).

On the other hand, when in S13 it is determined that a peak of the reflection intensity does not exceeds the predetermined threshold value, it is determined that the object is an on-road structure (S16). In that case, the setting unit 24 sets the detection region as an ordinary region described below (S17).

After the detection region is set in S15 or S17, the control unit 25 determines whether the object is within the detection region (S18). Then, when it is determined that the object has entered the detection region, the control unit 25 activates the warning or the control intervention of the assistance device 30 (S19). Incidentally, when in S18 it is determined that the object has not entered the detection region, the process ends.

Figure 4A:
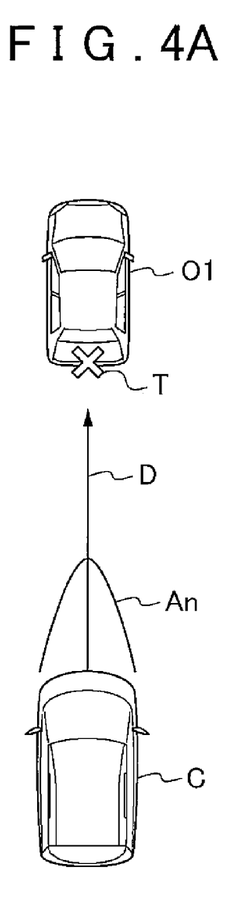
FIGS. 4A to 4C are diagrams showing operations performed when an object detected is determined as being a vehicle other than the host vehicle.
Figure 4B:
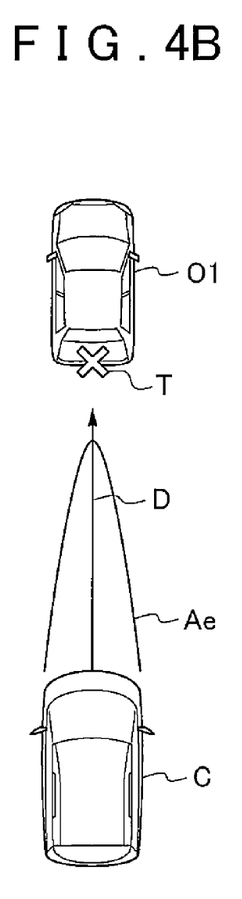
Figure 4C:
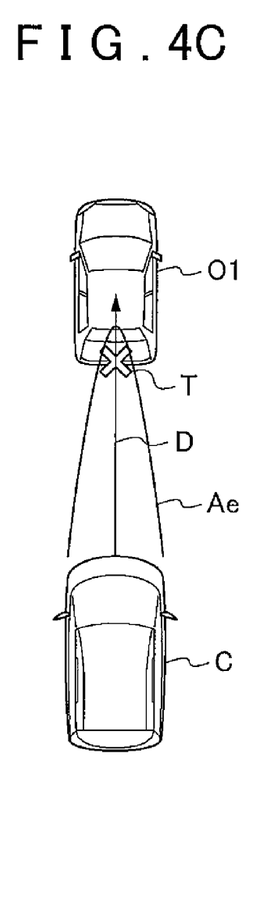

FIGS. 4A to 4C are diagrams showing operations performed when a detected object T is a vehicle O1 other than the host vehicle. As shown in FIG. 4A, during a state in which the detection region is set as an ordinary region An, the determination unit 23 determines whether the object T present forward of the vehicle C (host vehicle) is a vehicle O1 other than the host vehicle. Then, as shown in FIG. 4B, the setting unit 24 sets an expanded region Ae that is temporarily expanded, as the detection region. Then, as shown in FIG. 4C, when the object T enters the expanded region Ae as the vehicle C moves along a traveling path D, the control unit 25 activates the assistance device 30. Therefore, when the expanded region Ae is used, the collision avoidance control can be performed with time margin prior to a collision with the object T.

Figure 5A:
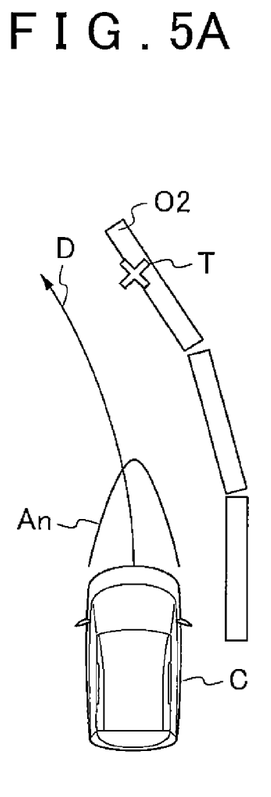
FIGS. 5A to 5C are diagrams showing operations performed when an object detected is determined as being an on-road structure.
Figure 5B:
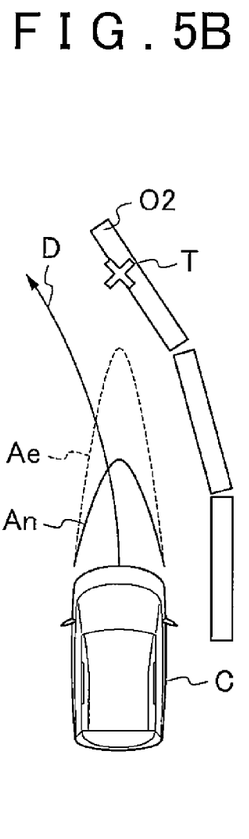
Figure 5C:
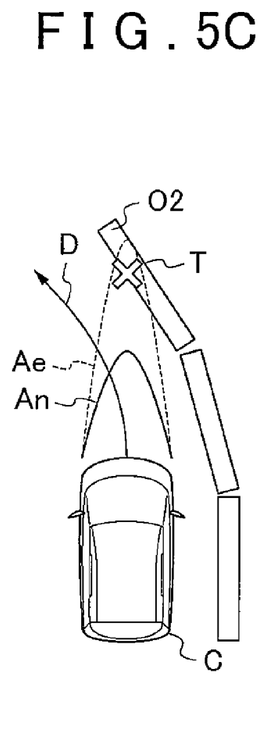

FIGS. 5A to 5C are diagrams showing operations performed when a detected object T is determined as an on-road structure O2. As shown in FIG. 5A, during a state in which an ordinary region An is set as the detection region, the determination unit 23 determines that an object T present forward of the vehicle C (host vehicle) is an on-road structure O2 (a guardrail in an example shown in FIGS. 5A to 5C). Then, the setting unit 24 maintains the setting of the ordinary region An as the detection region as shown in FIG. 5B. Then, as shown in FIG. 5C, while the vehicle C moves along a traveling path D, the control unit 25 does not activate the assistance device 30 as long as the object T does not enter the detection region (ordinary region An).

FIGS. 5B to 5C also show, as a comparative example, a case where an expanded region Ae is set for detection of the object T present forward of the vehicle C, regardless of the kind of the object T. In this case, when the on-road structure O2 is detected, the expanded region Ae is set as the detection region as shown by a broken line in FIG. 5B. Then, if the object T enters the detection region (expanded region Ae) as the vehicle C moves along the traveling path D, the assistance device 30 is activated.

Consequently, in the case where a guardrail (an on-road structure) is present, although the on-road structure can be avoided by normally performing the steering along the traveling path D, the collision avoidance control is activated. Incidentally, in the case where a steel plate is present, although the steel plate can be avoided by normal steering or although there is no need to take an avoiding action, the collision avoidance control is activated. Hence, it sometimes happens that the driver is disturbed by unnecessary warning or unnecessary control intervention.

In the flowchart shown in FIG. 2, illustration is made in conjunction with the case where the kind of a detected object is determined on the basis of a result of the comparison of a peak of the reflection intensity with the predetermined threshold value. However, the kind of the object may also be determined by taking into account the tendency of change of peaks of the reflection intensity or the magnitude of amplitude thereof.

Figure 6:
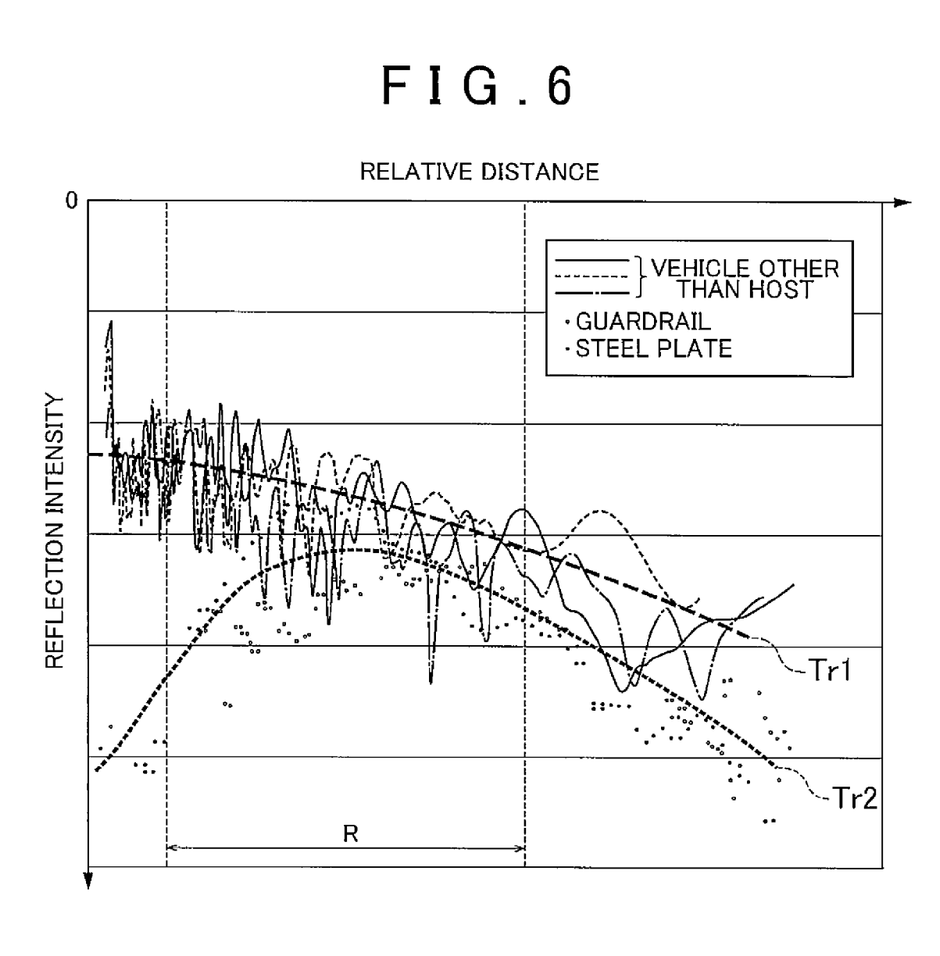
FIG. 6 is a diagram showing a tendency of change of peaks of the reflection intensity in comparison between vehicles other than the host vehicle and on-road structures.

FIG. 6 is a diagram showing the tendencies of change of peaks of the reflection intensity between vehicles other than the host vehicle and on-road structures. FIG. 6 shows, together with the detection waveforms shown in FIG. 3, examples of a tendency of change Tr1 of peaks of the reflection intensity of a vehicle other than the host vehicle (an average tendency of change regarding three kinds of vehicles other than the host vehicle) and a tendency of change Tr2 of peaks of the reflection intensity of an on-road structure (an average tendency of change of regarding two kinds of on-road structures) in comparison.

As shown in FIG. 6, although peaks of the reflection intensity change with the distance to the object, peaks of the reflection intensity of a vehicle other than the host vehicle increases as the host vehicle approaches the vehicle, due to the reflection characteristics of the object (vehicle). On the other hand, peaks of the reflection intensity of an on-road structure tends to decrease as the host vehicle approaches the on-road structure in the case where the vehicle posture changes due to steering avoidance. This is because the detection wave reflected from the on-road structure becomes less as the host vehicle approaches the on-road structure, in association with the position of the host vehicle (detection sensor 10) relative to the on-road structure. Hence, on the basis of the tendency of change of peaks of the reflection intensity, it can be more accurately determined whether the object is a vehicle other than the host vehicle.

The determination based on the tendency of change of peaks is performed by, for example, determining whether the tendency of change of peaks of the reflection intensity switches from an increase tendency to a decrease tendency as the relative distance to the object passes a predetermined relative distance. The predetermined relative distance is set beforehand so that a vehicle other than the host vehicle and an on-road structure can be discriminated from each other. A result of the determination may be used for the setting of the detection region for the collision avoidance control, and may also be used for other uses.

Furthermore, the determination based on the tendency of change of peaks may be performed singularly, or may also be performed in combination with the determination based on comparison of the peaks with the predetermined threshold value. That is, when peaks do not decrease in intensity as the host vehicle approaches the object or when peaks exceed the predetermined threshold value, it may be determined that the object is a vehicle other than the host vehicle. It may be determined that the object is a vehicle other than the host vehicle, when peaks do not decrease in intensity as the host vehicle approaches the object and peaks exceed the predetermined threshold value.

Figure 7A:
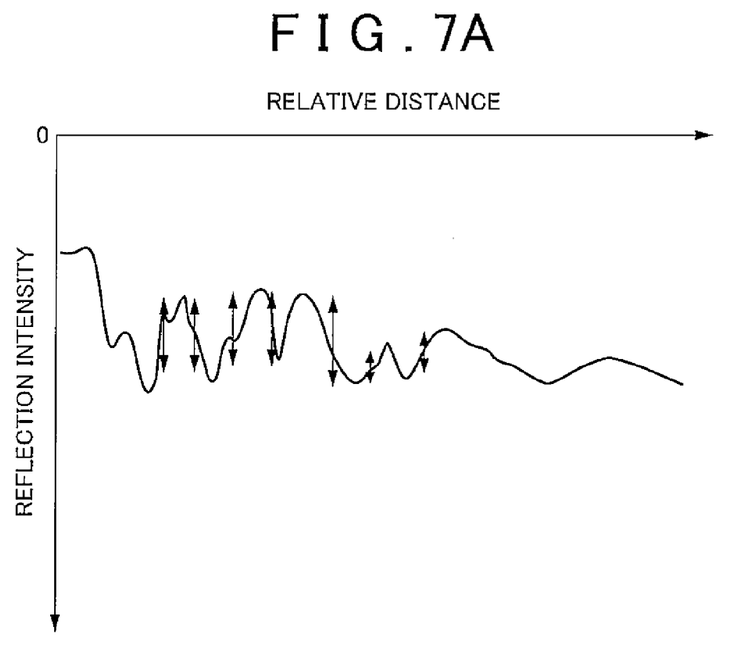
FIGS. 7A and 7B are diagrams showing the magnitudes of amplitudes of the reflection intensity between a vehicle other than the host vehicle and an on-road structure.
Figure 7B:
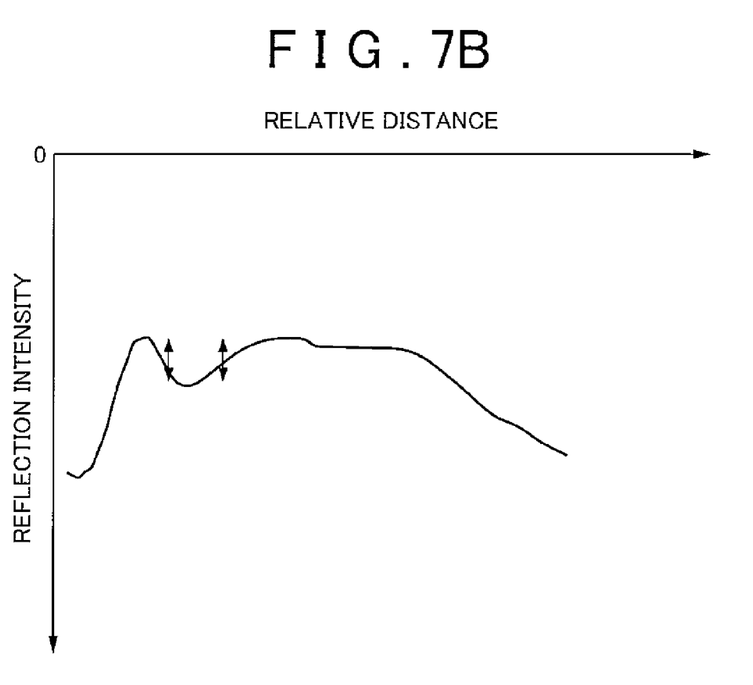

FIGS. 7A and 7B are diagrams showing the magnitudes of amplitude of the reflection intensity of a vehicle other than the host vehicle and an on-road structure in comparison. FIG. 7A show an example of the magnitude of amplitude of the reflection intensity of a vehicle other than the host vehicle and FIG. 7B shows an example of the magnitude of amplitude of the reflection intensity of an on-road structure.

As shown in FIGS. 7A and 7B, although the amplitude of the reflection intensity changes with the distance to the object, the amplitude of the reflection intensity of a vehicle other than the host vehicle (indicated by vertical arrows in FIG. 7A) tends to be larger than the amplitude of the reflection intensity of an on-road structure (indicated by vertical arrows in FIG. 7B), due to the reflection characteristics of the objects. This is because, in association with the positional relationship between the host vehicle (the detection sensor 10) and a vehicle other than the host vehicle, the detection wave reflected from a vehicle other than the host vehicle is more subject to the influence of phase interference of a multipath system than the detection wave reflected from an on-road structure is. Hence, it can be more accurately determined whether the object is a vehicle other than the host vehicle, on the basis of the magnitude of amplitude of the reflection intensity.

It is to be noted herein that the determination based on the magnitude of amplitude is performed by, for example, determining whether the amplitude of the reflection intensity exceeds a predetermined threshold value. The predetermined threshold value is set beforehand so that vehicles other than the host vehicle can be discriminated from on-road structures. Results of the determination may be used for the setting of a detection region for the collision avoidance control, and may also be used for other uses.

Furthermore, the determination based on the magnitude of amplitude is performed in combination with the determination based on comparison of a peak with the predetermined threshold value. That is, when a peak exceeds the predetermined threshold value and the amplitude is large, it is determined that the object is a vehicle other than the host vehicle. Alternatively, the determination based on the magnitude of amplitude may be performed in combination with the determination based on the tendency of change of peaks. Further alternatively, the determination based on the magnitude of amplitude may also be performed in combination with both the determination based on comparison of a peak with the predetermined threshold value and the determination based on the tendency of change of peaks.

As described above, according to the object determination apparatus in accordance with the embodiment of the invention, when a peak of the reflection intensity of the detection wave reflected from an object detected exceeds the predetermined threshold value, it is determined that the object is a vehicle other than the host vehicle. Although peaks of the reflection intensity change with the distance to the object, peaks of the reflection intensity of a vehicle other than the host vehicle tends to be higher than peaks of the reflection intensity of an on-road structure (a guardrail, a steel plate, etc.). Hence, by comparing peaks of the reflection intensity with the predetermined threshold value, it can be determined whether the detected object is a vehicle other than the host vehicle. It can be accurately determined whether the detected object is a vehicle other than the host vehicle.

Furthermore, the determination unit 23 may determine whether the object is a vehicle other than the host vehicle on the basis of the tendency of change of peaks of the reflection intensity which change with the distance to the object. It is to be noted herein that although peaks of the reflection intensity change with the distance to the object, peaks of the reflection intensity of a vehicle other than the host vehicle increase in intensity as the host vehicle approaches the vehicle, due to the reflection characteristics of the object. On the other hand, peaks of the reflection intensity of an on-road structure tend to decrease in intensity as the host vehicle approaches the on-road structure when the posture of the host vehicle changes due to steering avoidance. Hence, on the basis of the tendency of change of peaks of the reflection intensity, it can be more accurately determined whether the object is a vehicle other than the host vehicle.

Furthermore, the determination unit 23 may also determine whether the object is a vehicle other than the host vehicle on the basis of the magnitude of amplitude of the reflection intensity which changes with the distance to the object. It is to be noted herein that although the amplitude of the reflection intensity changes with the distance to the object, the amplitude of the reflection intensity of a vehicle other than the host vehicle tends to more greatly change than the amplitude of the reflection intensity of an on-road structure, due to the reflection characteristics of the objects. Hence, on the basis of the magnitude of amplitude of the reflection intensity, it can be more accurately determined whether the object is a vehicle other than the host vehicle.

Furthermore, according to the collision avoidance assistance apparatus in accordance with the embodiment of the invention, the use of an expanded detection region makes it possible to perform the collision avoidance control with time margin prior to the collision with a vehicle other than the host vehicle.

Furthermore, it is to be noted that the foregoing embodiment merely illustrates a best mode for carrying out the object determination apparatus and the collision avoidance assistance apparatus of the invention and that the object determination apparatus and the collision avoidance assistance apparatus of the invention are not limited to those described above in conjunction with the embodiment. The object determination apparatus and the collision avoidance assistance apparatus of the invention may be those obtained by modifying the object determination apparatus and the collision avoidance assistance apparatus in accordance with the foregoing embodiment or by applying them to other apparatuses, without departing from the gist of the invention.

Furthermore, the invention is also applicable to programs for determining that an object detected is a vehicle other than the host vehicle when a peak of the reflection intensity of the detection wave reflected from the object exceeds the predetermined threshold value according to the above-described method, or to computer-readable recording media that store such programs. The invention is also applicable to programs for expanding the detection region when the object is determined as being a vehicle other than the host vehicle according to the above-described method, or to computer-readable recording media that store such programs.

Furthermore, the foregoing embodiment is described above in conjunction with the case where a part of the functions of the object determination apparatus and a part of the functions of the collision avoidance assistance apparatus are realized by the single ECU 20. However, these functions may also be realized by a plurality of ECUs instead of the single ECU 20.

While the disclosure has been explained in conjunction with the specific exemplary embodiments thereof, it is evident that many alternatives, modifications, and variations will be apparent to those skilled in the art. Accordingly, the exemplary embodiments of the disclosure as set forth herein are intended to be illustrative, not limiting. There are changes that may be made without departing from the scope of the disclosure.

What is claimed is:

1. An object determination apparatus comprising:
    a sensing device that is mounted in a host vehicle, and that sends detection wave and receives the detection wave reflected from an object, and that detects the object in accordance with the received detection wave;
    a detection unit that detects reflection intensity of the detection wave received by the sensing device, the reflection intensity changing in accordance with distance to the object; and
    a determination unit that determines a state of the reflection intensity by comparing a peak of the reflection intensity with a predetermined threshold value and determines whether the object is a vehicle other than the host vehicle based on the state of the reflection intensity and lateral position information of the host vehicle obtained from the reflection intensity,
    wherein the predetermined threshold value is set to discriminate a vehicle-type object from an on-road structure-type object.

2. The object determination apparatus according to claim 1, wherein
    the determination unit determines whether the object is the vehicle other than the host vehicle based on tendency of change of the plurality of peaks of the reflection intensity detected by the detection unit.

3. The object determination apparatus according to claim 1, wherein
    the determination unit determines whether the object is the vehicle other than the host vehicle based on magnitude of fluctuations of the reflection intensity detected by the detection unit.

4. The object determination apparatus according to claim 3, the determination unit determines the object as the vehicle other than the host vehicle when the magnitude of fluctuations exceeds a reference value, and determines the object as an on-road structure when the magnitude of fluctuations is equal to or lower than the reference value.

5. The object determination apparatus according to claim 1, wherein
    the determination unit determines that the object is an on-road structure when it is determined that the peak of the reflection intensity detected by the detection unit does not exceed the predetermined threshold value.

6. A collision avoidance assistance apparatus wherein
    when the object is determined as being a vehicle other than a host vehicle by the object determination apparatus according to claim 1, a detection region that is used for determining whether to perform a collision avoidance control, and that is set in a traveling direction of the host vehicle, and that is a region into which it is determined whether the object has come is made larger than when the object is determined as not being a vehicle other than the host vehicle.

7. The object determination apparatus according to claim 1, the determination unit determines the object as the vehicle other than the host vehicle when the peak of the reflection intensity continuously increases as the host vehicle approaches the detected object, and determines the object as an on-road structure when the peak of the reflection intensity start decreasing from a certain distance to the detected object as the host vehicle approaches the detected object.

8. An object determination method comprising step of:
    sending detection wave and receiving the detection wave reflected from an object, and detecting the object in accordance the received detection wave;
    detecting reflection intensity of the detection wave received, the reflection intensity changing in accordance with distance to the object;
    determining a state of the reflection by comparing a peak of the reflection intensity with a predetermined threshold value, the predetermined threshold value being set to discriminate a vehicle-type object from an on-road structure-type object; and
    determining whether the object is a vehicle other than the host vehicle based on the state of the reflection intensity and lateral position information of the host vehicle obtained from the reflection intensity.

* * * * *